H. H. STEELE.
TYPE WRITING MACHINE.
APPLICATION FILED MAR. 27, 1905.

997,517.

Patented July 11, 1911.
5 SHEETS—SHEET 3.

Witnesses
F. E. Steele
Ann Job

Inventor
Herbert H. Steele.

H. H. STEELE.
TYPE WRITING MACHINE.
APPLICATION FILED MAR. 27, 1905.

997,517.

Patented July 11, 1911.
5 SHEETS—SHEET 5.

WITNESSES:

INVENTOR:
Herbert H. Steele
By
HIS ATTORNEY

UNITED STATES PATENT OFFICE.

HERBERT H. STEELE, OF SYRACUSE, NEW YORK, ASSIGNOR TO UNION TYPEWRITER COMPANY, OF JERSEY CITY, NEW JERSEY, A CORPORATION OF NEW JERSEY.

TYPE-WRITING MACHINE.

997,517. Specification of Letters Patent. Patented July 11, 1911.

Application filed March 27, 1905. Serial No. 252,216.

*To all whom it may concern:*

Be it known that I, HERBERT H. STEELE, a citizen of the United States, residing at Syracuse, in the county of Onondaga and State of New York, have invented a new and useful Improvement in Type-Writing Machines, of which the following is a specification.

Typewriting machines have heretofore been provided with tabulating mechanism that enable the operator to jump the carriage frame one column stop to the next succeeding column stop, and where it is necessary to skip over certain columns, the carriage must be released and arrested at each intermediate stop, until it finally reaches the predetermined stop and arrests the carriage at the columnar field where the desired entry is to be made. Another form of mechanism enables the operator to skip over any intermediate stops and arrest the carriage at any predetermined columnar position, without being temporarily stopped by the first or any intermediate column stops. Still another form of machine embodies the tabulating mechanism last described and also includes a second independently operable tabulating or denominational stop mechanism, first one mechanism and then the other being operated to cause the desired results. With this last form of machine which includes both column and denominational-stop mechanisms, to print denominationally at any desired column, it is first necessary to arrest the carriage at the predetermined point by the engagement of the predetermined column stop with a coöperating stop and then to release the carriage a second time to bring the said column stop into engagement with a denominational stop, to arrest the carriage and bring a predetermined point on the paper to the printing position, whereby a series of numbers may be printed in units, tens, hundreds columns, etc., within the column field.

My present invention has for one of its objects to overcome this objection of successively arresting the carriage, when it is desired to skip over certain intermediate column fields and print denominationally within any predetermined column, by enabling the operator to jump the carriage at one operation or by one movement to any desired denominational position within any desired columnar field.

Another object of the invention is to provide mechanical means which enable the operator to release the carriage and then arrest it at any predetermined letter space position along the entire line of print by a single movement of the carriage.

Another object of my invention is to provide a construction in which each of a series of stops may be used, at will, as a column stop to define a columnar field or as a denominational stop to define the denominational positions within its associated column field.

Another object is to place the whole tabular mechanism at the front of the machine where it is more convenient than at the rear of the machine.

Another object is to arrange the whole series of stops so that they cannot be removed from the machine but are merely shifted to any desired position and then locked against displacement.

Another object is to comprise margin-stops with the tabulating mechanism to arrest the carriage at both extreme ends of the line of print.

A still further object is to attach a tabulator guide, index or chart at any desired point along the column stop disk, to define each denominational position of print, within any defined columnar field.

A still further object of my invention is to provide a single mechanism operable to secure the proper arrest of the carriage at any desired denominational position within any desired columnar-field.

Another object of my invention is to provide a tabulating mechanism in which a single actuation of a part is sufficient to determine the proper point of arrest of the carriage at any desired denominational position within any desired columnar field.

To the above and other ends which will hereinafter appear, my invention consists in the features of construction, arrangements of parts and combinations of devices to be more fully described and particularly pointed out in the appended claims.

Figure 1:
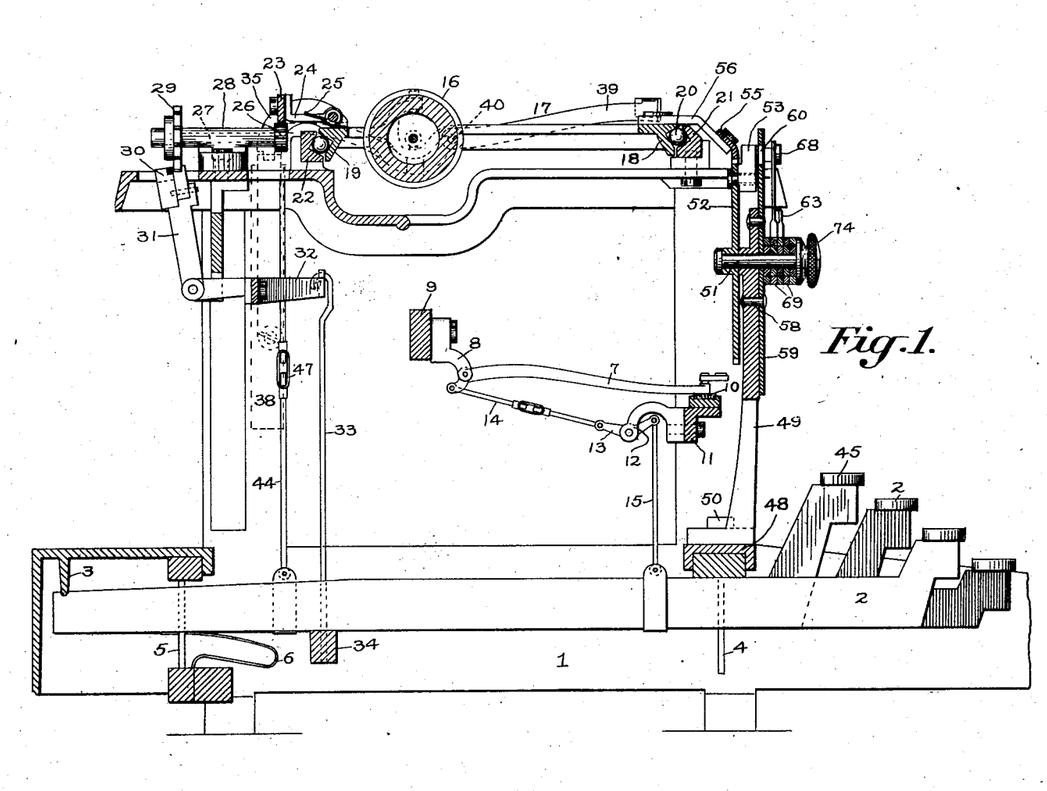
Figure 1 is a view in vertical section through a visible writing typewriting machine, showing my invention applied thereto; some of the parts being broken away and other parts omitted for the sake of clearness. The section in this view is taken on the line $x$—$x$ of Fig. 2.
Figure 2:
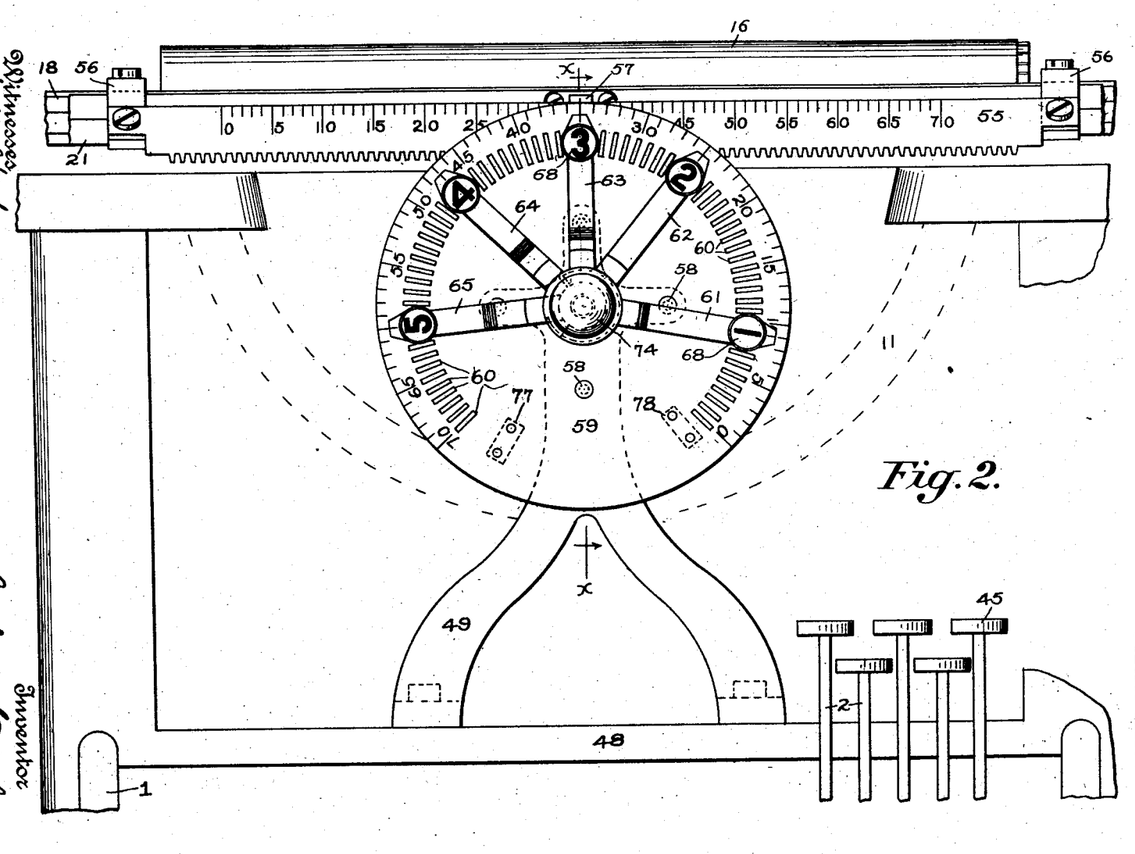
Fig. 2 is an enlarged front elevation with portions of the frame broken away and parts omitted.

The main base frame 1, incloses the usual key levers 2, that may be fulcrumed at 3 and provided with front and rear combs 4 and 5 respectively. A restoring spring 6 coöperates with each key lever and maintains it normally in the elevated position. Each key lever is connected with a type bar 7 that is pivotally mounted within a suitable hanger 8 adjustably secured to the type bar segment 9. The forward end of each type bar normally rests on a pad 10 mounted upon a sector 11 to form a basket for the whole series of bars. The sector also supports a series of segmentally arranged hangers 12 each hanger having a lever 13 pivoted thereto and each lever 13 is connected with the associated type bar through a link 14 and is connected with the associated key lever through a link 15. Each type bar 7 is adapted to swing upwardly and rearwardly and strike a platen 16 at the front thereof so that each character printed may be visible from the front of the machine. The platen 16 is of the cylindrical type mounted upon a shaft that turns in bearings in a suitable carriage 17 comprising two end bars, a front bar 18 and a rear bar 19, each of the latter bars being provided with suitable ways to receive antifriction balls or rollers 20 that engage with similar ways formed in the ordinary carriage rails 21 and 22 that support the carriage above the top plate of the frame and permit said carriage to move freely from side to side of the machine. The carriage is provided with a feed rack 23 that may be attached to pivoted arms 24 pivoted to the carriage and having a spring 25 that may be coiled around the pivots of said arms as shown, to force the rack down and normally maintain the teeth thereof in operative engagement with a feed pinion 26. The shaft 27 of this pinion is mounted in a stationary bearing 28 and an escapement wheel 29 is operatively connected to the shaft in the usual manner and is coöperative with suitable feed dogs 30 that afford the usual step-by-step letter space feed to the paper carriage. The escapement dogs 30 are mounted upon a dog rocker 31 having a transverse arm 32 that is connected by links 33 to the usual universal bar 34 underlying the key levers 2. The carriage is provided with a rearwardly extending arm 35 that may be provided as shown, with a hook member 36 (Fig. 4) adapted to receive the free end of a suitable tape or band 37 that is connected to the usual spring-drum 38 that moves the carriage in a letter-space feed direction. The usual carriage release key 39 may be pivoted to an end bar of the carriage as at 40 and extends rearwardly to and beneath the end of the feed rack 23, in order to provide means to raise the said rack out of engagement with the pinion 26 when it is desirable to move the carriage freely in either direction.

The platen mounting, carriage construction, and type bar and key lever action shown are not of my invention and these parts may be varied at will and so far as my present invention is concerned it may be applied to various styles of typewriting machines.

Figure 4:
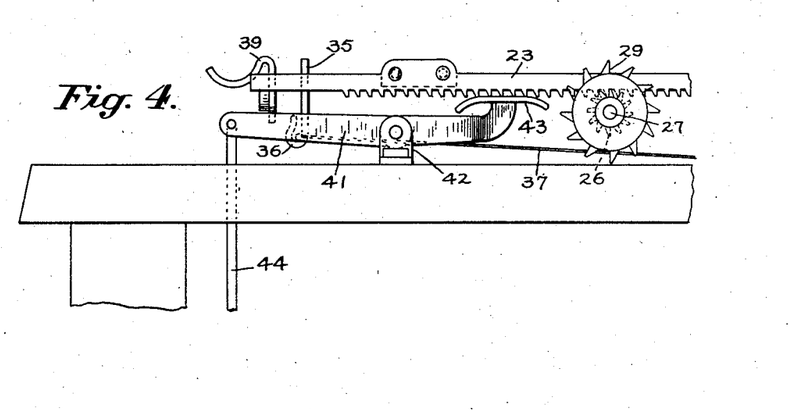
Fig. 4 is a fragmentary rear elevation of the upper portion of the machine to illustrate the manner of releasing the carriage from the escapement mechanism.

While the carriage may be moved freely in either direction by the use of the release lever 39 as just described, for the purposes of my present invention, I prefer to use other means to release the carriage from its step-by-step feed or escapement mechanism when the tabulating mechanism is brought into operation. One way to accomplish this result is shown in Figs. 1 and 4. A lever 41 is pivotally mounted to a suitable bracket 42, made fast to the top plate of the machine, and said lever is provided with a shoe 43 which underlies the feed rack 23, and is situated at the right hand end of the lever adjacent the escapement wheel 29. The outer end of said lever 41 is perforated to receive the end of a wire connection or link 44 that passes downwardly through the top plate and is connected at the lower end to the release key 45 (Figs. 1 and 2), which is of the same general shape as the character keys, but is positioned so as to be depressible independently of the universal bar 34. I prefer to make the link 44 in the nature of a two-part link, the two parts being united by a turn buckle 47 in order to obtain proper adjustment between the key 45 and the lever 41.

The base frame 1 is usually formed with a stiffening brace 48 and on this brace, adjacent the center thereof, is mounted an upright bracket 49 that may be removably secured thereto by screws 50. The upper end of said bracket is provided with an opening in which a short shaft 51 is received and fixed, forming a stationary axis or spindle for a toothed disk or gear wheel 52 at the rear of said bracket. The shaft 51 likewise extends forwardly from said bracket 49 for purposes presently to appear. The gear 52 is provided with a projecting member, tabulating stop or dog 53 that may be rigidly fixed thereto by screws 54. A toothed rack 55 is adjustably fixed to suitable arms 56 that are fastened to the front bar 18 of the carriage. The teeth of the rack 55 are always in engagement with the teeth of the gear 52, hence as the carriage is moved in either direction, the gear and its associated dog or tabulating stop 53 will rotate through a fixed path and will move in unison with the carriage. The rack bar 50 is provided with graduations to indicate letter space positions along the line of print, the position of the printing point being indicated by a suitable pointer 57, thus forming a carriage scale and pointer.

Figure 3:
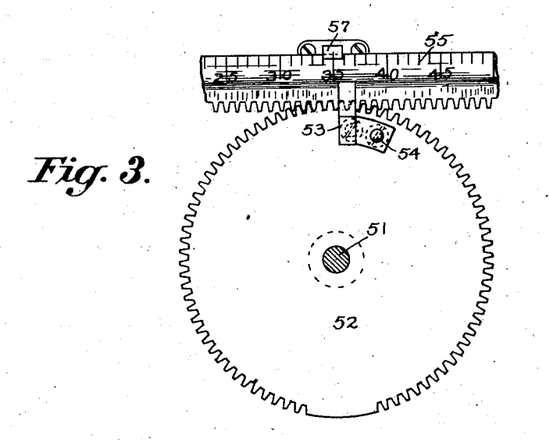
Fig. 3 is a detail front elevation of parts of the tabulating mechanism with other parts sectioned away.

To the front face of the bracket 49, is rigidly fixed as with rivets 58 or otherwise, a circular disk 59 having a series of radial slots 60 suitably spaced apart to correspond to the different letter space positions of the carriage throughout its travel, and each slot is indexed to correspond with the graduations on the rack 55. By referring to Fig. 1, it will be seen that the slots 60 are circularly arranged and correspond to the circular path of movement of the dog 53, as it moves around its axis 51, under the action of the carriage. Thus, when the carriage is moved by hand or otherwise, so that the printing point will be at, say, 35, as indicated by the graduation "35" on the bar 55 registering with the pointer 57, the dog or tabulating stop 53 will be automatically positioned to register with the thirty-fifth slot in the disk 59, indicated by the index numeral "35" on the disk, as will be made clear by a comparison of Figs. 1 and 3. Similarly, when the carriage has been moved to the extreme right-hand for the commencement of a line as indicated by the registration of the pointer 57 with the zero graduation on the carriage scale, the dog 53 will have moved along its circular path to register with the zero slot in the dial.

With the construction thus far described, the carriage has a free movement in either direction when released from the escapement mechanism and the dog 53 will traverse its circular path in either direction corresponding to the distance that the carriage is moved. To arrest the dog or stop 53 at varying positions, by inserting a tabulating stop or arresting member through the slots 60 to intersect the path of said dog 53, forms a feature of my invention that will be next described.

Figure 7:
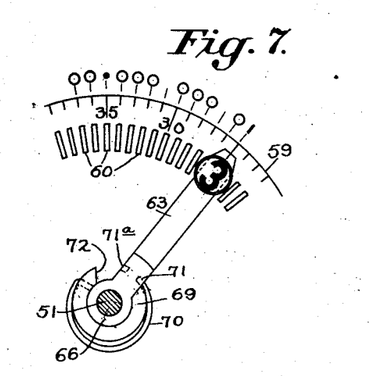
Fig. 7 is a view similar to Fig. 6, but illustrating the scope of the tabular stop without destroying its columnar position.
Figure 8:
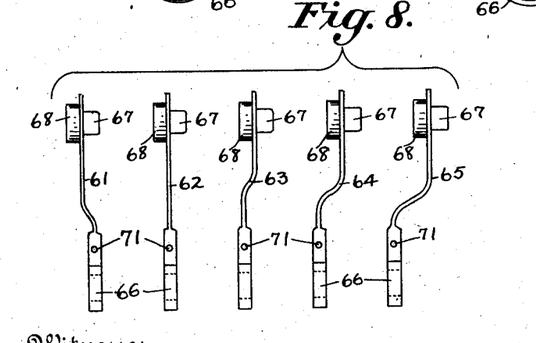
Fig. 8 is a detail side elevation of the five column stops.

On the shaft or spindle 51 that projects through the bracket and through the disk 59, are loosely mounted a series of five arms, or stop-carriers 61, 62, 63, 64 and 65 respectively, though from certain aspects of my invention any suitable number of such arms may be provided. These arms are each provided with a hub section 66 (Figs. 6, 7 and 8) of sufficient thickness to insure a proper bearing on the shaft, and are each reduced in thickness by removing a portion of the metal from the two flat sides, as shown in Fig. 8, to give the free ends a certain degree of flexibility. Each arm is provided with a projecting blade or tabulating stop 67 adapted to pass in and out of the slots 60 and with a key finger piece or push button 68 inscribed with an index or indicating mark or numeral denoting the relative position of the stop from zero. Around the hub 66 of each arm is placed a sector or collar 69 (Fig. 6) adapted to be maintained fixed and provided with a suitable spring 70 that engages in a hole 71 formed in the arm adjacent the hub, and tends to hold the said arm against the arresting face 72 of the associated collar 69.

Figure 6:
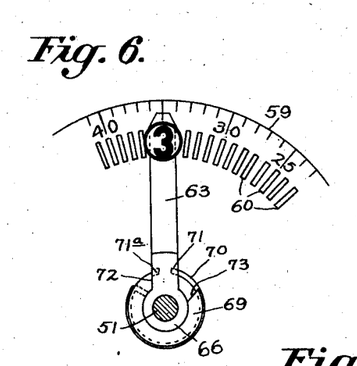
Fig. 6 is a fragmentary diagrammatic front view showing the column stop and a portion of its associated disk.

As shown in Fig. 6, the gap in each collar 69 is greater than the width of the associated arm so as to permit the said arm to move in one direction against the tension of its spring 70 until said arm reaches the arresting face 73 on the collar, the distance which each arm can be moved from one arresting face 72 to the other 73 corresponding to, say, ten letter space movements of the carriage. To permit of this action it is necessary to provide a means to hold the collars 69 stationary, which is accomplished by making each of the collars a little thicker than the hub 66 of the associated arm and by binding the whole series of collars together by a suitable thumb-nut 74 threaded to the forward end of the fixed shaft 51. By this arrangement a loosening of the thumb-nut 74 will permit each individual collar 69 and the associated arm to be adjusted around the shaft or pivot 51 so that the stop 67 on each arm may be set so as to be normally opposite any desired slot 60 in the dial 59 and when the thumb-nut 74 is tightened or screwed in it will hold the various collars 69 in the positions to which they have been adjusted and the normal position of each stop 67 is thus determined and each arm is adapted to swing from its normal position around the shaft 51 in one direction a distance corresponding to, say, ten letter space movements of the carriage. While the construction shown permits the said arms and their associated tabulating stops 67 to have a free movement against the tension of their springs 70 in one direction or from left to right from their normal positions, such movement being independent of the collars 69, it is obvious that the parts may be reversed and the arms have free movement from their normal positions corresponding to the letter space movement of the carriage, instead of the reverse direction as illustrated in Fig. 7, for purposes which will be presently described. As shown in Fig. 8, the five arms that constitute or carry stops to arrest the dog 53, are off-set relatively to each other so as to bring the rear ends of all the stops 67 in the same transverse plane or at the same distance from the dial 59.

The five arms 61, 62, 63, 64 and 65 with their associated blades or stops 67 constitute a series of column-stops that may be variably shifted or adjusted to different positions relative to the slotted disk 59 to determine the different columnar positions at which the carriage may be arrested, and each stop may be moved rearwardly from its set position into the slot opposite which it is adjusted to intersect the path of the dog 53 and thus arrest the carriage at the desired columnar field. Each arm can also be turned against the tension of its spring 70 around the pivot 51 a distance corresponding to from one to ten letter space movements of the carriage and may then be moved rearwardly through the slot 60 which registers therewith to intercept the dog 53 in advance of the position of arrest determined by a mere rearward movement of each stop 67 from its normal or column determining position, for purposes presently to appear.

Figure 9:
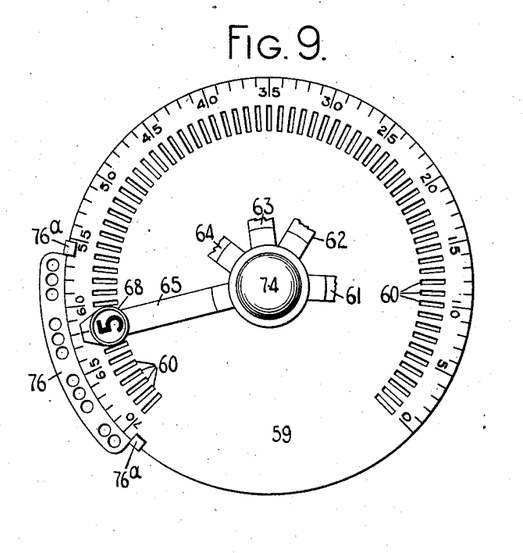
Fig. 9 is a detail front view of the tabulating mechanism showing a tabulating chart arranged to denote the denominational positions at the end of the line of print.
Figure 10:
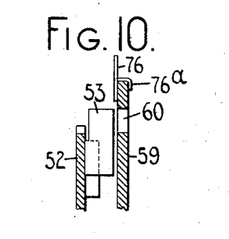
Fig. 10 is a fragmentary transverse sectional view of the same, the section being taken through the tabulating chart 76.
Figure 11:
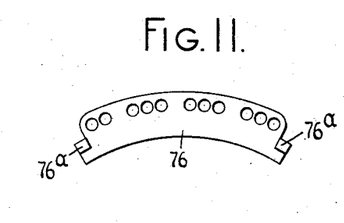
Fig. 11 is a detail plan view of the tabulating chart which in Figs. 9 and 10 is shown attached to the disk.

The provision of a plurality of stops 67 arrangeable or adjustable to different set positions and adapted to coöperate at such positions with the stop 53 to arrest the carriage at any one of a plurality of columnar positions or fields, enables the operator to arrest the carriage at will, at any of these predetermined points, and without any calculation or forethought after the stops are first adjusted. In order to facilitate positioning any of the stops 67 for coöperation with the dog 53 so as to properly arrest the carriage at the desired denominational position within a selected column field or at the extreme end of the line, I provide a denominational chart or index 76 that may be adjustably attached to the disk as shown at Figs. 9 and 10, to indicate the proper positions for setting any of the stop-carrying arms in order that the carriage may be arrested at the proper position to write at the desired denominational position within a columnar field. In the present instance the index 76 is shown provided with U-shaped clamping fingers or members 76ª which straddle the edge of the disk 59 and clamp the chart in its adjusted position thereon. The chart is shown in the present instance set on the dial in advance of a point "70" thereon, said point "70" corresponding to the normal point of arrest of the carriage at the end of a line. When the arm 65 is shifted to the position shown to register with the index mark at sixty-two, the carriage will be arrested at a point to enable the operator to print, say, 10,000.00 as indicated on the chart in advance of the extreme travel of the carriage at "70". At Fig. 11, is shown a detailed view of this denominational chart, illustrating two overhanging or clamping ears that embrace the edge of the slotted disk 59 and by which the chart or index may be adjusted around the dial.

Figure 5:
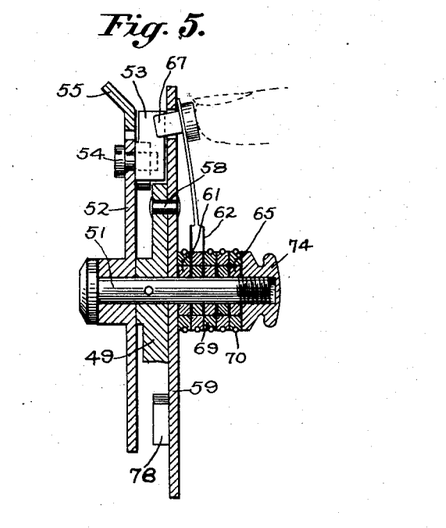
Fig. 5 is a central vertical section through the tabulating mechanism at a plane indicated by the line x, x, Fig. 2.

From the foregoing description the operation of the various parts will be seen to be as follows: In the construction shown in Figs. 1, 2, etc., the operator will first arrange the arms 61, 62, 63, 64 and 65 at positions around the slotted disk 59 coincident with the index mark or number corresponding to the predetermined points along the line of print at which it is desired to arrest the carriage to determine, in this instance, the position of five of the six columnar fields. This is accomplished by loosening the thumb-nut 74 and shifting each arm individually with its collar 69 and when all are properly adjusted, the said thumb-nut may be tightened and the collars 69 bound together between the face of the disk 59 and the thumb nut 74. If, then, it is desired to print an item in the first column commencing at zero, it is done in the usual way by the manipulation of the character keys. From this position it may be desired to skip over the columnar field controlled by the second column stop and to jump the carriage direct to the column controlled by the third column stop and there print other characters, commencing at the beginning of this columnar field which is at "35" on the paper scale. The arm 63, bearing the numeral "3" on the finger piece or button which indicates the third column stop 67, is pushed rearwardly, causing the stop or blade 67 to pass within the slot 60 opposite said stop and to project beyond the disk 59 to intersect the path of the dog or stop 53, as shown at Fig. 5. This operation may be accomplished by the left hand of the operator and while the stop 63 is still depressed, the right hand may depress the release key 45, to pull downward on the connection 44 and cause the lever 41 to rock on its axis and raise the shoe 43 into engagement with the face of the teeth of the escapement-rack 23, and raise the said rack out of engagement with the pinion 26, thus releasing the carriage. As the carriage moves to the left or in a letter space feed direction, under the influence of the spring drum, the rack 55 will move in unison and cause the gear 52 to rotate about its axis and the dog or stop 53 will move toward the projecting blade or stop 67 until arrested thereby and the carriage will be stopped at "35" on the carriage scale. The key 45 is then released and the rack 23 allowed to reëngage with the pinion 26, and the arm 63 is allowed to assume its normal position. The carriage is now positioned to receive an entry on the paper within the column determined by the third column stop, and a glance at the graduated disk 59 shows the operator that there are twelve letter space distances within this column field and that the number of characters that may be printed is limited to twelve. The operator may now desire to skip over the next column field and enter within the last column the amount of the entry in dollars and cents, and in denominational order. For purposes of illustration we will assume that the amount to be written is "1,800.00" and that the last digit will register with the "70" on the scale, it will be seen that the first character "1" is located eight letter-space distances in advance of the "70" counting a letter-space for each punctuation mark, which will bring the numeral "1" at the sixty-second graduation on the scale. The arm 65 is shifted to the position indicated in Fig. 9, so that the pointer at the end of the arm will register with the sixty-second slot or the sixty-second graduation and the blade or stop 67 is pushed rearwardly through said slot to project within the path of the dog or stop 53. When the arm 65 is shifted from its column stop position to the position just described, its ring 69 remains stationary and the hub portion 66 of said arm turns therein and in doing so expands the spring 70. The release key 45 is now depressed as previously described to release the carriage and permit the dog 53 to strike the projecting blade or stop 67 to arrest the carriage at the proper selected denominational position within the selected columnar field and the rack 23 is permitted to reëngage with the pinion 26 after the carriage has been arrested. When the operator releases pressure on the arm 65, the stop 67 is withdrawn from the slot by the resilience of said arm, and when the stop is free from the slot, the spring 70 will cause said arm to turn around the pivot 51 and return to the normal position, or until the said arm abuts with the face 72 of the collar or sector-ring 69. The sum "1,800.00" is now printed within the last column field and the last digit will register with "70" of the paper or carriage scale.

The operation just described for the arm 65, illustrates the manner of setting the various arms or column stops 67 to coöperate with the stop 53 to arrest the carriage at the beginning of each column field and also the manner of employing the stops 67 when it is desired to print denominationally within any column field. In this last mentioned operation each of the arms and its associated stop 67 may be shifted around the pivot 51 to varying denominational positions within an individual column field and the last digit of each denominational entry written on the paper will register with the extreme right hand letter space position within the column field controlled by the particular stop 67 employed. While the arrangement for advancing the column stop 67 from a column determining position to a denominational determining position within a column field may be advantageous for certain classes of work, in other classes of work where only one column in which denominational positioning is effected is ever used, it may be convenient to adjust the position of the stop to indicate the decimal point of the column to be printed, as shown in Figs. 6 and 7, wherein the position of the decimal point is indicated at "35" on the dial. This indicates that the decimal point is to be located at a corresponding point in the travel of the carriage and the scope of movement of the arm within the sector ring 69 is limited to the printing of numerals up to eight digits and two punctuation marks although this movement may be greater or less as determined by the character of the collars 69 employed in the construction. The arm 63 and stop carried thereby are advanced or moved from the decimal position to intercept the dog or stop 53 in advance of the decimal point or as shown in Fig. 7. The stop 67 may be positioned to arrest the carriage so that an amount up to "99,999,999.99" may be printed and the decimal point will register with the graduation "35" of the paper scale. Whether the arms 61, 62, 63, 64 and 65 are arranged to have a relative movement from left to right or from right to left within their sectors or collars 69, as before stated, depends upon the character of the work to be executed and if one arrangement is not satisfactory the other may be used by simply removing each arm from the shaft 51, withdrawing the end of the spring 70 from the detent 71, removing the sector 69 and then replacing it in a reversed position so that the spring 70 will engage with the hole 71ª on the other side of the arm. This will cause the said arm to normally contact with the face 73 of the sector instead of the face 72 as shown in Fig. 6, and will enable the operator to move the arm from right to left from the normal or column determining or decimal position in order to set the stop 67 in any desired denominational position, as already described, for the arm 65 in Fig. 2.

From the foregoing description of the operation of my invention it will be seen that while each arm and its associated stop constitute a column stop to arrest the carriage at the various predetermined columnar positions and at the same time permit the operator to skip over at will one or more intermediate columns, it will also be seen that each arm and stop also constitute a denominational stop and allow the operator to print denominational positioned characters within any columnar-field. It will also be seen that when it is desired to skip over certain intermediate columns and print characters at any desired predetermined denominational positions within any desired predetermined columnar-field, the carriage when arrested by the stop 67 is arrested at once at the proper denominational position within the proper columnar field, and not as heretofore first at the columnar position and afterward at the denominational position. This feature of skipping intermediate columns and jumping by a single tabulating operation and by a single movement of the carriage to a denominational position within the proper columnar field without first arresting the carriage by a column stop to define first the columnar field and then the proper denominational positioning within that field is novel with and is an important feature of my invention. To assist the operator in defining the denominational positions when shifting the arms and stops, the chart or index shown in Figs. 9, 10 and 11 may be used to indicate the proper location of any series of digits, that columns of figures may be printed in proper denominational order to bring units under units, tens under tens, etc.

While I have described certain mechanism as the embodiment of my invention, it will be understood that the same can be still further modified and still keep within the spirit and scope of my invention and that the invention may be applied to other designs of machines than the one shown in my drawings. Thus, for example, other methods of moving the stops 67, to intersect the path of the dog or stop 53 may be employed. The term "column stops" as used in the following claims is intended from certain aspects of my invention to designate any stops that determine the columnar positions of arrest of the carriage, whereas the term "denominational stop" from certain aspects of my invention is intended to designate any stop that determines the denominational position of arrest of the carriage. The term "combined column and denomination stop" is employed from certain aspects of my invention to designate any stop that is employed or is capable of being employed to determine either the columnar position of arrest or the denominational position or to determine the proper denominational position of arrest within a given columnar field, whereas the term "tabulating stop," whether applied to the stops 67, or 53, is intended to designate broadly a stop for tabulating purposes. Furthermore, other devices may be substituted for the dog 53 to arrest the carriage by the coöperation therewith of suitable tabulating devices and the use of the terms "dog" and "rotating dog" or "rotating stop" in the claims is intended to apply to any suitable mechanism that will perform the required function of the part in question.

From the foregoing description it will be seen that I have provided a simple, cheap and efficient tabulating mechanism which is in the nature of an attachment that can be applied to existing forms of typewriting machines without changing the structural features of said machines; that the tabulator may be applied to the front of the machine where it is easily accessible to the operator, and, nevertheless, does not interfere with the operation of other parts of the machine; that it is unnecessary to detach any of the column stops or other parts of the tabulator in order to effect an adjustment of the parts for tabulating work; that the tabulator may be quickly and accurately operated by a single movement to determine the position of arrest of the carriage at any denominational position within any columnar field and that the carriage by a single movement passes to and is arrested in such position.

Broad claims covering the construction herein shown are embodied in my divisional application Serial No. 465,611, the claims herein being limited to features not disclosed in said divisional application.

Having now fully described my invention, I desire to secure the same by Letters Patent and therefore claim—

1. In a typewriting machine and tabulating mechanism, the combination of a tabulating stop, and a series of hand actuated column stops mounted for movement on their support into and out of coöperative relation with said tabulating stop and to different positions and normally out of coöperative relation with said tabulating stop, said column stops being independently operable and the construction affording a skipping of one or more intermediate column stops and an arrest of the carriage at any predetermined column field.

2. In a typewriting machine and tabulating mechanism, the combination of a carriage, a tabulating stop which moves in unison with the carriage, a plurality of coöperative combined column and denominational selecting stops normally out of the path of said tabulating stop, and means for controlling the relation of said stops and enabling the tabulating stop to skip one or more of said column stops and arrest the carriage at any predetermined denominational position in any desired columnar field when the carriage is released.

3. In a typewriting machine and tabulating mechanism, the combination of a tabulating stop, a plurality of independently operable combined denominational and column selecting stops of uniform length coöperative with but normally spring-pressed out of the path of said tabulating stop, and means for controlling the relation between said stops and for enabling the tabulator stop and certain of the column stops to skip one another at will and to bring any desired combined stop and the tabulating stop into coöperation and to arrest the carriage at any predetermined denominational position within any desired columnar field when the carriage is released.

4. In a typewriting machine and tabulating mechanism, the combination of a tabulating stop, a plurality of key controlled combined denominational and column selecting stops that are each mounted on its support for independent movement into the path of the tabulating stop and each mounted for movement to any desired denominational selecting position within its column field.

5. In a typewriting machine and tabulating mechanism, the combination of a carriage, a rotating tabulating stop that rotates as the carriage moves, a series of column stops of uniform length, means for affording an adjustment of said column stops at different set positions, and means for bringing any desired column stop into coöperation with the tabulating stop and to skip the preceding column stops in order to arrest the carriage at any desired column field.

6. In a typewriting machine and tabulating mechanism, the combination of a carriage, a rotating tabulating stop that moves in unison with the carriage, a plurality of pivoted column stops of uniform length that normally are spring-pressed out of the path of said tabulating stop, and means for operating said column stops individually to bring any desired column stop into the path of the tabulating stop, thereby causing the latter to skip intermediate columns and arrest the carriage at any desired column field.

7. In a typewriting machine and tabulating mechanism, the combination of a rotating tabulating stop, a disk having radial slots, a plurality of adjustable column stops of uniform length each adapted to coöperate with a plurality of slots in said disk, and means for bringing any desired column stop and the tabulating stop into coöperation to arrest the carriage at any desired column field.

8. In a typewriting machine and tabulating mechanism, the combination of a rotating tabulating stop, a disk having radial slots, a plurality of pivoted coöperative tabulating stops each movable around its pivot to bring it into coöperation with different slots in said disk and thereby affording a relative skipping movement of said stops past each other so that the rotating stop may be brought into coöperation with any desired pivoted stop to arrest the carriage at any predetermined column field.

9. In a typewriting machine and tabulating mechanism, the combination of a rotating tabulating stop, a disk having radial slots that are indexed to define columnar positions, a plurality of coöperative adjustable column stops, and the construction affording a skipping of certain of the intermediate column stops at will and bringing the rotating tabulating stop into coöperation with any of the column stops to arrest the carriage at any predetermined column field.

10. In a typewriting machine and tabulating mechanism, the combination of a tabulating stop, a carriage-releasing mechanism, a plurality of combined denominational and column selective stops variably movable to intercept the path of the tabulating stop, and key controlled means to individually shift or move said combined stops from their columnar positions to any denominational position within their respective column fields.

11. In a typewriting machine and tabulating mechanism, the combination of a tabulating stop, a carriage-releasing mechanism, and a series of key controlled combined denominational and column selective stops of uniform length, each independently and variably movable under control of the keys to determine the columnar and denominational position of arrest of the carriage.

12. In a typewriting machine and tabulating mechanism, the combination of a rotating stop that moves in unison with the carriage, a carriage-releasing mechanism, a series of tabulating stops of uniform length coöperating with said rotating stop, and key controlled means operative to control the relation between said rotating stop and said coöperative tabulating stops to skip one or more of said tabulating stops at will and arrest the carriage at any letter space point along the line of print as determined by the actuation of said key controlled means.

13. In a typewriting machine and tabulating mechanism, the combination of a rotating tabulating stop that rotates as the carriage travels, a carriage-releasing mechanism, a series of pivoted combined denominational and column selective stops coöperative with said tabulating stop, and key actuated means coöperating with said selective stops to turn each of them different distances on its pivot and to afford a skipping of intermediate selective stops when desired and an arrest of the carriage at any denominational position within any predetermined column.

14. In a typewriting machine and tabulating mechanism, the combination of a rotating tabulating stop, and a pivoted column stop that is spring-pressed to its columnar position but adapted to be moved letter space distances within its columnar field, and means for bringing said stops into coöperative relation.

15. In a typewriting machine and tabulating mechanism, the combination of a rack moving with the carriage, a toothed member always in operative engagement with said rack and provided with a tabulating stop, a column stop that is spring pressed to its columnar position but adapted to be moved letter space distances within its columnar field, and means for bringing said stops into coöperative relation.

16. In a typewriting machine and tabulating mechanism, the combination of a rack fixed to the carriage, a toothed member engaging said rack and provided with a tabulating stop, a pivoted column stop that is spring-pressed to its columnar position but adapted to be moved letter space distances within its columnar field, and means for bringing said stops into coöperative relation.

17. In a typewriting machine and tabulating mechanism, the combination of a tabulating stop movable in unison with the carriage, a plurality of column stops that are individually spring pressed to their columnar positions but are adapted to be moved letter space distances within their columnar fields, and means for bringing at will any of said column stops and said tabulating stop into coöperation.

18. In a typewriting machine and tabulating mechanism, the combination of a rack fixed to the carriage, a toothed member engaging said rack and provided with a tabulating stop, a plurality of column stops that are individually spring pressed to their columnar positions but are adapted to be moved letter space distances within their columnar fields, and means for bringing at will any of said column stops and said tabulating stop into coöperative relation.

19. In a typewriting machine and tabulating mechanism, the combination of a rack fixed to the carriage, a toothed member engaging said rack and provided with a tabulating stop, a carriage-releasing mechanism, a slotted disk, a plurality of column stops that are individually spring-pressed to their columnar positions but adapted to be moved letter space distances within their columnar fields, and key actuated means for controlling the relation between said column stops and the tabulating stop and for bringing any desired column stop and the tabulating stop into coöperation.

20. In a typewriting machine, the combination with the paper support and with the printing mechanism, one of said parts being movable with respect to the other in the direction of the line of print, of means for arresting the travel of said movable part embracing two stop members, one of said members comprising a plurality of column stops mounted on one of said parts and the other of said members comprising a single coöperating stop mounted to travel in unison with the other of said parts, said column stops being individually movable and key controlled means for actuating any of said column stops to denominationally position it to effect an arrest of the carriage at a predetermined denominational position in any predetermined columnar field at the end of a single run of the carriage as determined by said key controlled means.

21. In a typewriting machine and in a tabulating mechanism, the combination of a series of column stops, a coöperative tabulating stop, a plurality of keys each movable to variable extents and operative to bring a selected one of said column stops and the tabulating stop into coöperative relation, and a denomination indicator and column indicator for said keys.

22. In a typewriting machine and tabulating mechanism, the combination of a carriage, a series of column stops, a single stop coöperating therewith, and key actuated means for effecting a relative adjustment of said stops in a direction that corresponds to the run of the carriage to determine the denominational position of arrest of the carriage and for bringing said single stop and any desired column stop into coöperation, so that the carriage can be stopped at any desired denominational position in any desired columnar field at the end of a single run of the carriage.

23. In a typewriting machine and tabulating mechanism, the combination of a carriage, column stops therefor, a coöperating stop, said column stops being individually movable to different extents in a direction that corresponds to the travel of the carriage to determine both the denominational and columnar positions of arrest and which are moved in a direction at substantially right angles to said movement to bring a column stop and said coöperating stop into coöperative relation, and key controlled means for moving said column stops.

24. In a typewriting machine and tabulating mechanism, the combination of a carriage, a series of combined column and denomination determining stops, a single coöperating stop, and key controlled means for effecting relative movements between said stops in two directions and relative movements between said stops to different extents in one direction, the relative movement between the stops in one direction determining both the denominational and columnar position of arrest of the carriage, and the relative movement between the stops in another direction bringing certain of said stops into coöperative relation.

25. In a typewriting machine and tabulating mechanism, the combination of a carriage, a series of individually movable combined column and denominational determining stops that extend a uniform distance from their support, a coöperating stop, and key actuated means for effecting a relative rotation of said stops and to bring certain of them into coöperative relation to arrest the carriage at any desired columnar field and at any desired denominational position within the selected columnar field at the end of a single run of the carriage.

26. In a typewriting machine and tabulating mechanism, the combination of a carriage, a rotating tabulating stop, a series of combined column and denominational determining stops projecting to a uniform distance from their support, key controlled means for individually moving any of said column stops to different column selecting positions and for effecting relative denominational movements between said stops and to bring the stops into coöperative relation to arrest the carriage at the end of an uninterrupted run in any desired denominational position within the selected columnar field.

27. In a typewriting machine and tabulating mechanism, the combination of a carriage, a series of column stops projecting a uniform distance from their support, a single stop coöperating with the column stops, and key actuated means coöperating with each of said column stops to move it in two directions independently of the other column stops, the movement in one direction being transverse to the direction of the travel of the carriage to bring the selected column stop and said single stop into coöperation so as to afford an arrest of the carriage in any desired columnar field without first arresting the carriage at a preceding columnar field, and the other movement of each of said column stops being in a direction that corresponds to the travel of the carriage to determine the denominational position of arrest within the selected columnar field, the same key-actuated means effecting both movements of the selected column stop.

28. In a typewriting machine, the combination with a carriage, of tabulating mechanism including a plurality of separately operable stops each movable to any one of a plurality of operative positions.

29. In a typewriting machine and tabulating mechanism, the combination of a tabulator stop, a series of coöperative stops, a slotted disk for said coöperative stops, and means including key controlled means for controlling the relation between said tabulator stop and coöperative stops to arrest the carriage at any desired letter space position.

30. In a typewriting machine and tabulating mechanism, the combination of a tabulator stop, a series of coöperative stops of uniform length, a slotted disk for said coöperative stops, and means including key controlled means for controlling the relation between said tabulator stop and said coöperative stops to effect an arrest of the carriage at any desired letter space position.

31. In a typewriting machine and tabulating mechanism, the combination of a tabulator stop, and a series of separately operable key controlled column stops each adjustable to different column determining positions and movable separately under key control into coöperative relation with said tabulator stop.

32. In a typewriting machine and tabulating mechanism, the combination of a carriage, a tabulator stop movable in unison with the carriage, and a series of separately operable key controlled column stops carried by the frame of the machine and each adjustable to different column determining positions and movable separately under key control into the path of said tabulator stop.

33. In a typewriting machine and tabulating mechanism, the combination of a tabulator stop, a series of key controlled separately operable column stops adjustable to different column determining positions, and yielding means for normally holding said column stops out of effective position.

34. In a typewriting machine and tabulating mechanism, the combination of a carriage, a tabulator stop movable in unison with the carriage, a series of key controlled separately operable column stops carried by the frame of the machine and adjustable to different column determining positions, and yielding means for normally holding said column stops out of coöperative relation with said tabulator stop, the column stops being movable into coöperative relation with said tabulator stop under key control.

35. In a typewriting machine and tabulating mechanism, the combination of a carriage, a tabulator stop situated at the front of the machine and movable in unison with the carriage, a series of key controlled separately operable column stops carried by the frame of the machine at the front thereof and adjustable to different column determining positions, and yielding means for normally holding said column stops out of coöperative relation with said tabulator stop, the column stops being movable into coöperative relation with said tabulator stop under key control.

36. In a typewriting machine and tabulating mechanism, the combination of a tabulator stop, a series of separately operable key controlled column stops each adjustable to different column determining positions and movable separately under key control into coöperative relation with said tabulator stop, and means for securing said column stops against displacement by the impact between said tabulating stop and said column stops.

37. In a typewriting machine and tabulating mechanism, the combination of a carriage, a tabulator stop movable in unison with the carriage, a series of separately operable key controlled column stops carried by the frame of the machine and each adjustable to different column determining positions and movable separately under key control into the path of said tabulator stop, and means with which said column stops are coöperative in their operative positions to prevent displacement thereof under the impact of said tabulator stop.

38. In a typewriting machine and tabulating mechanism, the combination of a carriage, a tabulator stop movable in unison with the carriage, a series of key controlled separately operable column stops carried by the frame of the machine and adjustable to different column determining positions, yielding means for normally holding said column stops out of coöperative relation with said tabulator stop, the column stops being movable into coöperative relation with said tabulator stop under key control, and means with which said column stops engage when they are in coöperative relation with the tabulator stop to prevent the displacement of the column stops under the impact of the tabulator stop.

39. In a typewriting machine and tabulating mechanism, the combination of a carriage, a tabulator stop that moves in unison with the carriage, and a series of combined denominational and column selecting stops of uniform length coöperative with said tabulating stop to arrest the carriage at any predetermined denominational position within any selected columnar field.

40. In a typewriting machine and tabulating mechanism, the combination of a carriage, a tabulator stop that moves in unison with the carriage, and a series of stops, the stops of said series being adjustable to determine a series of columns and each stop of said series being independently movable to different positions within its own column to determine denominational positions within said column and each said stop being adapted to coöperate with the stop which moves in unison with the carriage whereby the series of stops are adapted to arrest the carriage in any selected column and in any desired denominational position within the selected column.

In testimony whereof I have signed my name to this specification in the presence of two subscribing witnesses.

HERBERT H. STEELE.

Witnesses:
F. E. STEELE,
ANN JOB.

Copies of this patent may be obtained for five cents each, by addressing the " Commissioner of Patents, Washington, D. C."